(12) United States Patent
Harris et al.

(10) Patent No.: US 11,200,522 B2
(45) Date of Patent: Dec. 14, 2021

(54) SYSTEM AND METHOD LINKING BUILDING INFORMATION MODELING AND ENTERPRISE RESOURCE PLANNING

(71) Applicant: VIEWPOINT, INC., Portland, OR (US)

(72) Inventors: Matthew Thomas Harris, Portland, OR (US); Robert Wilson Humphreys, Portland, OR (US); Lloyd Pickering, Portland, OR (US); Richard Stokoe, Portland, OR (US); Andrew Burden, Portland, OR (US); Andrew Thomson, Portland, OR (US); Andrew Ward, Portland, OR (US); Laurence Skoropinski, Portland, OR (US)

(73) Assignee: Viewpoint, Inc., Portland, OR (US)

( * ) Notice: Subject to any disclaimer, the term of this patent is extended or adjusted under 35 U.S.C. 154(b) by 914 days.

(21) Appl. No.: 15/443,844

(22) Filed: Feb. 27, 2017

(65) Prior Publication Data

US 2017/0169374 A1 Jun. 15, 2017

Related U.S. Application Data

(63) Continuation of application No. 13/919,956, filed on Jun. 17, 2013, now abandoned.
(Continued)

(51) Int. Cl.
*G06Q 10/06* (2012.01)
*G06Q 50/08* (2012.01)
*G06F 16/21* (2019.01)

(52) U.S. Cl.
CPC ..... *G06Q 10/06313* (2013.01); *G06F 16/212* (2019.01); *G06Q 50/08* (2013.01)

(58) Field of Classification Search
USPC ............................................. 705/7.23
See application file for complete search history.

(56) References Cited

U.S. PATENT DOCUMENTS

| 5,784,068 A | 7/1998 | Brown |
| 5,815,415 A | 9/1998 | Bentley et al. |

(Continued)

FOREIGN PATENT DOCUMENTS

| DE | 102009053585 A1 | 5/2010 |
| DE | 102009016588 A1 | 10/2010 |

(Continued)

OTHER PUBLICATIONS

Curry et al. (Edward Curry, James O'Donnell, Edward Corry, Souleiman Hasan, Marcus Keane, Seán O'Riain, Linking building data in the cloud: Integrating cross-domain building data using linked data, Advanced Engineering Informatics, vol. 27, Issue 2, 2013, pp. 206-219, ISSN 1474-0346).*

(Continued)

*Primary Examiner* — Matthew D Henry
(74) *Attorney, Agent, or Firm* — Perkins Coie LLP

(57) ABSTRACT

An electronic construction collaboration system for managing a construction project is provided. The electronic construction collaboration system includes an Enterprise Resource Planning (ERP) sub-system including a contract engine configured to generate at least one project contract including a contract data set and ERP metadata corresponding to Building Information Modeling (BIM) metadata included in a structural object of a construction project model in a BIM sub-system and an interconnection engine configured to associatively link the ERP metadata and the BIM metadata and send the contract data set to the BIM sub-system in response to associatively linking the ERP metadata and the BIM metadata.

18 Claims, 10 Drawing Sheets

Related U.S. Application Data

(60) Provisional application No. 61/661,170, filed on Jun. 18, 2012.

(56) References Cited

U.S. PATENT DOCUMENTS

| | | | |
|---|---|---|---|
| 5,987,242 A | 11/1999 | Bentley et al. | |
| 6,063,128 A | 5/2000 | Bentley et al. | |
| 6,199,125 B1 | 3/2001 | Cortesi | |
| 6,341,291 B1 | 1/2002 | Bentley et al. | |
| 6,385,563 B1 | 5/2002 | Vora et al. | |
| 6,501,501 B1 * | 12/2002 | Miyazawa | G06F 16/40 348/143 |
| 6,594,466 B1 | 7/2003 | Harned et al. | |
| 6,671,701 B1 | 12/2003 | Chouinard | |
| 6,753,859 B1 | 6/2004 | Segal | |
| 6,791,563 B2 | 9/2004 | Bragg et al. | |
| 6,791,567 B1 | 9/2004 | Segal | |
| 6,847,800 B2 | 1/2005 | Harned et al. | |
| 6,853,390 B1 | 2/2005 | Wandersleben et al. | |
| 6,925,473 B2 | 8/2005 | Thompson et al. | |
| 6,954,895 B1 | 10/2005 | Oak | |
| 7,062,532 B1 | 6/2006 | Sweat et al. | |
| 7,065,476 B2 | 6/2006 | Dessureault et al. | |
| 7,149,959 B1 | 12/2006 | Jones et al. | |
| 7,170,528 B1 | 1/2007 | Chater et al. | |
| 7,194,489 B2 | 3/2007 | Bentley et al. | |
| 7,197,181 B1 | 3/2007 | Cote | |
| 7,227,591 B2 | 6/2007 | Hwang et al. | |
| 7,265,753 B1 | 9/2007 | Zareski et al. | |
| 7,280,123 B2 | 10/2007 | Bentley et al. | |
| 7,283,135 B1 | 10/2007 | Cote et al. | |
| 7,302,368 B2 | 11/2007 | Rihtniemi et al. | |
| 7,324,102 B2 | 1/2008 | Inzinga et al. | |
| 7,330,771 B2 | 2/2008 | Casu et al. | |
| 7,330,821 B2 | 2/2008 | Wares | |
| 7,336,851 B1 | 2/2008 | Cote | |
| 7,418,666 B2 | 8/2008 | Cortesi et al. | |
| 7,428,548 B2 | 9/2008 | Bentley | |
| 7,484,183 B2 | 1/2009 | Look et al. | |
| 7,490,064 B2 | 2/2009 | Allin et al. | |
| 7,589,732 B2 | 9/2009 | Burtnyk et al. | |
| 7,617,076 B2 | 11/2009 | Rousu et al. | |
| 7,617,077 B2 | 11/2009 | Putnam et al. | |
| 7,630,496 B2 | 12/2009 | Liimatainen | |
| 7,672,888 B2 | 3/2010 | Allin et al. | |
| 7,725,384 B2 | 5/2010 | Allin et al. | |
| 7,734,546 B2 | 6/2010 | Allin et al. | |
| 7,742,617 B2 | 6/2010 | Smith et al. | |
| 7,761,266 B2 | 7/2010 | Mangon et al. | |
| 7,765,240 B2 | 7/2010 | Alho et al. | |
| 7,797,210 B2 | 9/2010 | Eichhorn et al. | |
| 7,800,615 B2 | 9/2010 | MacPherson | |
| 7,809,533 B2 | 10/2010 | Laukala et al. | |
| 7,818,250 B2 | 10/2010 | Allin et al. | |
| 7,844,419 B1 | 11/2010 | Gurrieri et al. | |
| 7,856,342 B1 | 12/2010 | Kfouri et al. | |
| 7,877,302 B2 | 1/2011 | Allin et al. | |
| 7,877,321 B2 | 1/2011 | Allin et al. | |
| 7,882,004 B2 | 2/2011 | Allin et al. | |
| 7,899,739 B2 | 3/2011 | Allin et al. | |
| 7,925,584 B2 | 4/2011 | Allin et al. | |
| 7,936,354 B2 | 5/2011 | Temesvari et al. | |
| 7,949,690 B2 | 5/2011 | McArdle et al. | |
| 7,958,185 B2 | 6/2011 | Rothermel | |
| 7,983,972 B2 | 7/2011 | Allin et al. | |
| 8,001,552 B1 | 8/2011 | Chickneas | |
| 8,022,953 B2 | 9/2011 | Heikkonen et al. | |
| 8,041,744 B2 | 10/2011 | Heikkonen et al. | |
| 8,046,210 B2 | 10/2011 | Suomi et al. | |
| 8,072,455 B2 | 12/2011 | Temesvari et al. | |
| 8,086,950 B2 | 12/2011 | Smith et al. | |
| 8,099,362 B2 | 1/2012 | Allin et al. | |
| 8,106,903 B2 | 1/2012 | Steinbock et al. | |
| 8,131,517 B2 | 3/2012 | Ghantous et al. | |
| 8,150,659 B2 | 4/2012 | Brown | |
| 8,165,935 B2 | 4/2012 | Allin et al. | |
| 8,171,008 B2 | 5/2012 | Rantanen | |
| 8,180,707 B2 | 5/2012 | Allin et al. | |
| 8,244,606 B2 | 8/2012 | Allin et al. | |
| 8,271,336 B2 * | 9/2012 | Mikurak | G06Q 30/0261 705/22 |
| 8,274,510 B2 | 9/2012 | Demchak et al. | |
| 8,296,199 B2 | 10/2012 | Allin et al. | |
| 8,306,883 B2 | 11/2012 | Allin et al. | |
| 8,306,924 B2 | 11/2012 | Ostanik | |
| 8,341,078 B2 | 12/2012 | Allin et al. | |
| 8,352,218 B2 | 1/2013 | Balla et al. | |
| 8,381,176 B1 | 2/2013 | Bentley et al. | |
| 8,402,392 B2 | 3/2013 | Look et al. | |
| 8,405,871 B2 | 3/2013 | Smith et al. | |
| 8,438,199 B1 | 5/2013 | Cleveland, Jr. et al. | |
| 8,473,470 B1 | 6/2013 | Cook, Jr. et al. | |
| 8,504,292 B1 | 8/2013 | Cote et al. | |
| 2001/0047251 A1 * | 11/2001 | Kemp | G06F 30/13 703/1 |
| 2003/0101098 A1 * | 5/2003 | Schaarschmidt | G06Q 30/0601 705/26.1 |
| 2003/0217275 A1 | 11/2003 | Bentley et al. | |
| 2004/0236711 A1 | 11/2004 | Nixon et al. | |
| 2004/0236754 A1 | 11/2004 | Workman et al. | |
| 2005/0188348 A1 * | 8/2005 | Han | G06T 17/10 717/105 |
| 2005/0246216 A1 * | 11/2005 | Rosen, III | G06Q 10/087 705/28 |
| 2005/0288808 A1 * | 12/2005 | Lopez | G06Q 30/018 700/97 |
| 2006/0074608 A1 | 4/2006 | Clay et al. | |
| 2006/0074609 A1 | 4/2006 | Freeman et al. | |
| 2006/0085322 A1 | 4/2006 | Crookshanks | |
| 2006/0271477 A1 | 11/2006 | Allin et al. | |
| 2007/0061154 A1 * | 3/2007 | Markvoort | G06Q 10/10 705/51 |
| 2007/0061428 A1 | 3/2007 | Haley et al. | |
| 2007/0186094 A1 | 8/2007 | Ghantous et al. | |
| 2007/0186149 A1 | 8/2007 | Ghantous et al. | |
| 2007/0239410 A1 | 10/2007 | Seppanen et al. | |
| 2007/0265963 A1 | 11/2007 | Allin et al. | |
| 2007/0282873 A1 * | 12/2007 | Ponessa | G06Q 10/06375 |
| 2007/0285424 A1 | 12/2007 | Cheng et al. | |
| 2007/0288207 A1 | 12/2007 | Backe et al. | |
| 2008/0234987 A1 | 9/2008 | Haley | |
| 2008/0238918 A1 | 10/2008 | Culver et al. | |
| 2008/0281735 A1 | 11/2008 | Allin et al. | |
| 2009/0204373 A1 | 8/2009 | Brown et al. | |
| 2010/0106654 A1 * | 4/2010 | Simpson | G06F 30/13 705/300 |
| 2010/0153280 A1 | 6/2010 | Fox et al. | |
| 2010/0153293 A1 | 6/2010 | Fox et al. | |
| 2010/0257485 A1 | 10/2010 | Ghantous et al. | |
| 2011/0102463 A1 | 5/2011 | Kaski et al. | |
| 2011/0119177 A1 | 5/2011 | Allin et al. | |
| 2011/0304628 A1 | 12/2011 | Fu et al. | |
| 2012/0022848 A1 | 1/2012 | Suomi et al. | |
| 2012/0066178 A1 * | 3/2012 | Omansky | G06F 16/27 707/626 |
| 2012/0116728 A1 | 5/2012 | Shear et al. | |
| 2012/0130521 A1 * | 5/2012 | Kohlhoff | G06T 19/00 700/98 |
| 2012/0191604 A1 | 7/2012 | Allin et al. | |
| 2012/0197789 A1 | 8/2012 | Allin et al. | |
| 2012/0197790 A1 | 8/2012 | Allin et al. | |
| 2012/0239886 A1 | 9/2012 | Rantanen | |
| 2012/0278334 A1 | 11/2012 | Abjanic | |
| 2012/0284178 A1 | 11/2012 | Allin et al. | |
| 2012/0299921 A1 | 11/2012 | Budge et al. | |
| 2012/0303499 A1 | 11/2012 | Allin et al. | |
| 2012/0310802 A1 | 12/2012 | Allin et al. | |
| 2013/0013269 A1 | 1/2013 | Martin et al. | |
| 2013/0018799 A1 | 1/2013 | Allin et al. | |
| 2013/0027385 A1 | 1/2013 | Lorenz et al. | |
| 2013/0054485 A1 | 2/2013 | Allin et al. | |
| 2013/0159833 A1 | 6/2013 | Look et al. | |

(56) References Cited

U.S. PATENT DOCUMENTS

| | | | |
|---|---|---|---|
| 2013/0173229 A1 | 7/2013 | Heikkonen et al. | |
| 2013/0181986 A1 | 7/2013 | Fowler et al. | |
| 2013/0181987 A1 | 7/2013 | Fowler et al. | |
| 2013/0191078 A1* | 7/2013 | Batra | G06F 30/15 703/1 |
| 2013/0194275 A1 | 8/2013 | Hrcka | |
| 2013/0197868 A1 | 8/2013 | Olsson et al. | |
| 2013/0218472 A1 | 8/2013 | Fu et al. | |
| 2014/0143005 A1* | 5/2014 | Jatla | G06Q 10/06313 705/7.23 |

FOREIGN PATENT DOCUMENTS

| | | |
|---|---|---|
| EP | 1255212 A1 | 11/2002 |
| EP | 1255391 A1 | 11/2002 |
| KR | 100593716 A | 6/2006 |
| KR | 1020060065838 A | 6/2006 |
| KR | 20100020060 A | 2/2010 |
| KR | 101105327 B1 | 1/2012 |
| WO | 9618939 A2 | 6/1996 |
| WO | 2013000027 A1 | 1/2013 |
| WO | 2013090942 A1 | 6/2013 |
| WO | 2013090944 A1 | 6/2013 |
| WO | 2013106802 A1 | 7/2013 |
| WO | 2013116859 A1 | 8/2013 |

OTHER PUBLICATIONS

RIB Software AG, SAP AG, "Integrated Building Information Modeling," XP002752659, Available Online at http://download.sap.com/kio0010/download.epd?context=ceaf9e9a97eacc7479abc0b0d9f074a1a979ce005dbb7248908abcf66896d9b00a5ab10552f35201e57fb5a791f9b54a0f3863472353102b, Nov. 25, 2009, 4 pages.

Muller, W., "Construction Process Integration (CPI) Based on Multi Model Design," Proceedings of the 11th International Conference on Construction Applications of Virtual Reality, XP002752657, Available Online at http://www.db-thueringen.de/servlets/DerivateServlet/Derivate-26107/21.pdf, Nov. 4, 2011, 7 pages.

ISA Korean Intellectual Property Office, International Search Report and Written Opinion of PCT/US2013/046195, dated Nov. 19, 2013, WIPO, 12 pages.

European Patent Office, Extended European Search Report Issued in Application No. 13806812.7, dated Jan. 15, 2016, 8 pages.

* cited by examiner

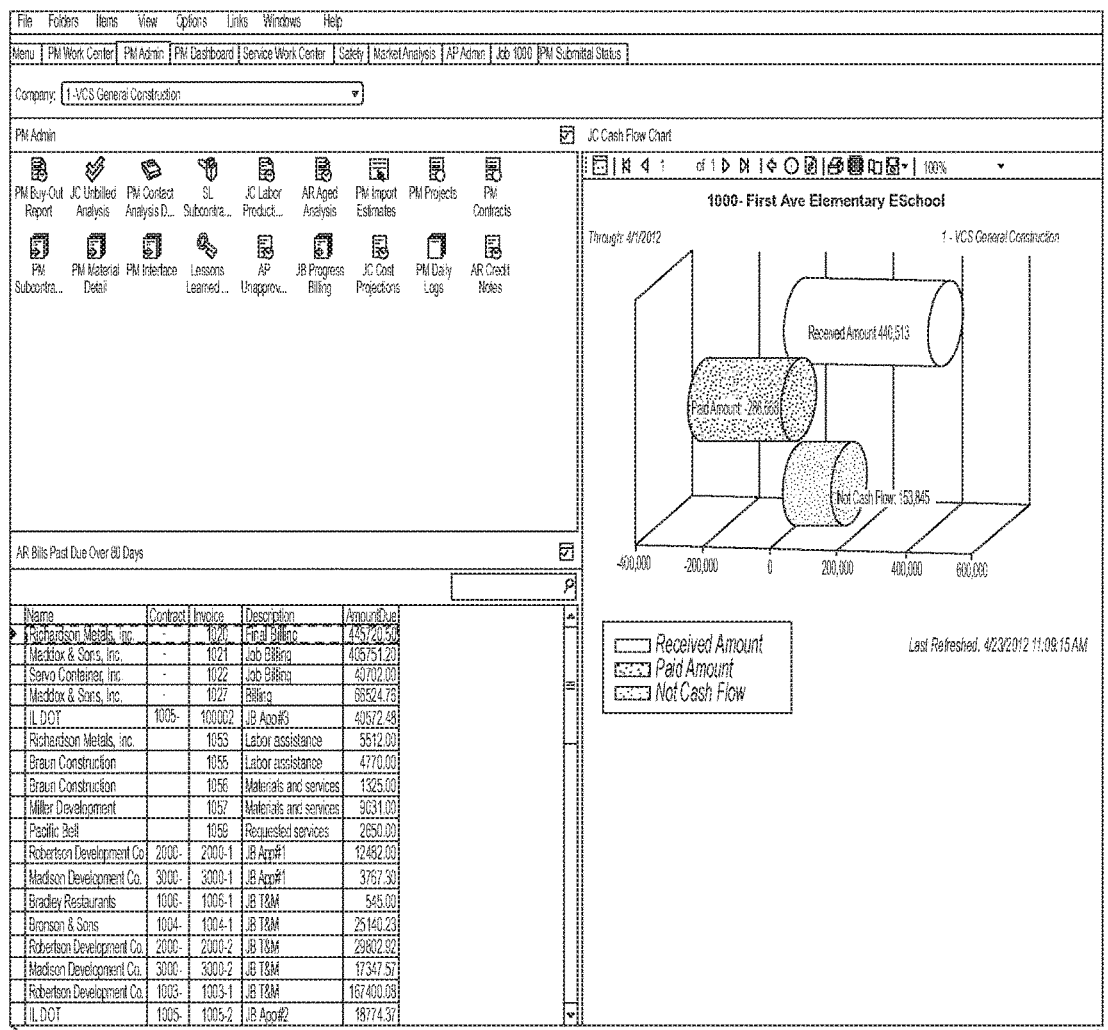
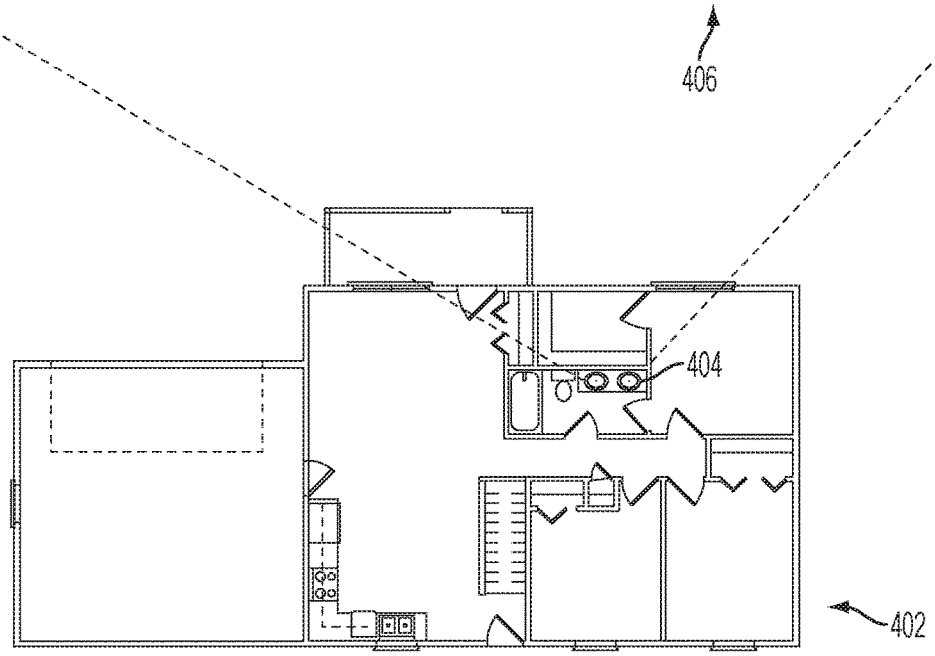
FIG. 5

SYSTEM AND METHOD LINKING BUILDING INFORMATION MODELING AND ENTERPRISE RESOURCE PLANNING

CROSS-REFERENCE TO RELATED APPLICATIONS

The present application is a continuation of U.S. patent application Ser. No. 13/919,956 entitled "SYSTEM AND METHOD LINKING BUILDING INFORMATION MODELING AND ENTERPRISE RESOURCE PLANNING", filed on Jun. 17, 2013. U.S. patent application Ser. No. 13/919,956 claims priority to U.S. Patent Application Ser. No. 61/661,170 entitled "LINKING BUILDING INFORMATION MODELING AND ENTERPRISE RESOURCE PLANNING", filed on Jun. 18, 2012. The entire contents of the above-referenced applications are hereby incorporated by reference for all purposes.

FIELD

The present disclosure relates generally to the technical field of data processing, and more particularly, to linking Building Information Modeling ("BIM") and Enterprise Resource Planning ("ERP").

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A construction project may involve collaboration between architects, engineers and contractors, all of whom may be directly or indirectly in the employ of an owner or other managing party. The architects and engineers may design buildings or other structures (e.g., by creating plans and/or models) that will serve their intended function, be structurally and mechanically sound, be safe, comply with various rules and regulations (also referred to as "code"), and meet the needs of the project owner. Contractors may construct the building or other structure based on models and/or designs provided by the architects and/or engineers. Contractors may include one or more general contractors, subcontractors, suppliers or other vendors, service providers, and so forth. In some cases, a "construction company" may include a general contractor and one or more subcontractors or suppliers in privity with the general contractor.

A construction project may be bifurcated between architects and engineers on the one hand, and the contractors on the other. Architects and engineers may be more specialized than contractors, and may tend to focus primarily on their designs and engineering specifications. On the other hand, the construction of the project may be perceived as fungible. Assuming an equivalent basis of training and experience, multiple construction companies may be capable of executing a project design nearly identically. While a project design may vary based on an individual architect's interpretation of owner needs, the construction of the project design may be similar from one contractor to the next. What distinguishes one group of contractors from another is how the work will be done. This may be defined in project contract documents. Project contract documents may precisely describe how the contractor will deliver the constructed designs to the owner. They may be highly specific to an individual general contractor and his/her negotiations with an owner. Project contract documents may describe, among other things, timelines, deliverables, budgets, and payment rates for the deliverables. Given the separate domains in which they function, architects and engineers on the one hand, and contractors on the other, have developed different systems and methods to manage their domains.

Many architects and engineers utilize computers with sophisticated drafting programs. Drafting programs rapidly evolving from representing two-dimensional ("2D") figures like squares, ovals, and trapezoids to representing of three-dimensional ("3D") volumes like columns, slabs, and tubes. Such 2D or 3D drafting programs may be referred to as "Building Information Modeling," or "BIM." BIM programs may provide architects and engineers with a library of volumes and/or objects from which they may develop a particular design for the project.

Many contractors also employ sophisticated systems, referred to as Enterprise Resource Planning ("ERP") systems, to manage project communications, contract documents, and job costs to increase the productivity and accountability of their businesses. ERP sub-systems may provide various parties such as business owners, managers, and partners access to job cost data, contract documents and financial data.

During the management of a mid-sized construction project, the average general contractor might interact with hundreds or even thousands of subcontractors and other venders, via tens of thousands of project and contract documents. The manual search to identify all of the pertinent documents, contracts, and data associated with a particular element of a project drawing or model may be time-consuming and/or inefficient.

In spite of the sophistication of the separate BIM and ERP sub-systems, a gap remains between the project model of the architect or engineer and the project contract of the contractor. In prior systems, there is not a link or association between project models and contract documents/financial performance data, or vice versa. Instead, an interested party may waste time manually looking up contracts pertinent to a particular portion of the project models, or by paging through the drawings for which a particular vendor has subcontracted. For example, a project manager (e.g., of a general contractor) may wish to learn more about the specifics of the contracts associated with a particular structure as described in the construction project models. To better understand the performance requirements associated with this particular structure, the project manager may first identify the structure using the BIM sub-system. The project manager must then switch from the BIM sub-system to the ERP sub-system (or to project contract notebooks in scenarios where there is no ERP sub-system) so that the project manager can look up the contracts associated with the particular structure. It is through this investigative process that the project manager can find relevant project documents (requests for information, submittals, etc.) and contracts (initial contract, pending and approved change orders, etc.) associated with the structure of interest.

SUMMARY

An electronic construction collaboration system for managing a construction project is provided. The electronic construction collaboration system includes an Enterprise Resource Planning (ERP) sub-system including a contract engine configured to generate at least one project contract including a contract data set and ERP metadata corresponding to Building Information Modeling (BIM) metadata included in a structural object of a construction project model in a BIM sub-system and an interconnection engine configured to associatively link the ERP metadata and the BIM metadata and send the contract data set to the BIM sub-system in response to associatively linking the ERP metadata and the BIM metadata.

Associatively linking metadata in the BIM and ERP sub-systems and utilizing this correlation to share data between the systems increases workflow efficiency by decreasing the time needed to search for information separate sub-systems, such as contract data sets. As a result, a user's productivity is increased thereby increasing the amount of work that can be accomplished in a given amount of time and increasing their earning potential. It will be appreciated that the system may be utilized by a wide range of professionals in the construction field such as contractors, engineers, architects, etc., thereby enabling contractors and engineers and/or architects to seamlessly share information, if desired.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 5 schematically depicts an example of contractual and/or or other ERP related information a user might see when they select an object in a BIM sub-system;

DETAILED DESCRIPTION

An electronic construction collaboration system for managing digital data related to one or more constructions projects is described herein. The system bridges a communication gap between a Building Information Modeling (BIM) sub-system and an Enterprise Resource Planning (ERP) sub-system. Specifically, metadata included the BIM sub-system is mapped to metadata included in the ERP sub-system and data related to the linked metadata may be exchanged between the two sub-systems based on the metadata mapping. The exchanged data may include structural object data, such as dimensional data defining the features and location of the object, and contract data, such as contract documents, cost data, labor hour data, and equipment hour data. As a result, users of the system, such as architects, engineers, and/or contractors, may quickly be provided with pertinent project data without undue searching or interactive switching between the sub-systems. Consequently, the productivity of the users may be increased.

Figure 1:
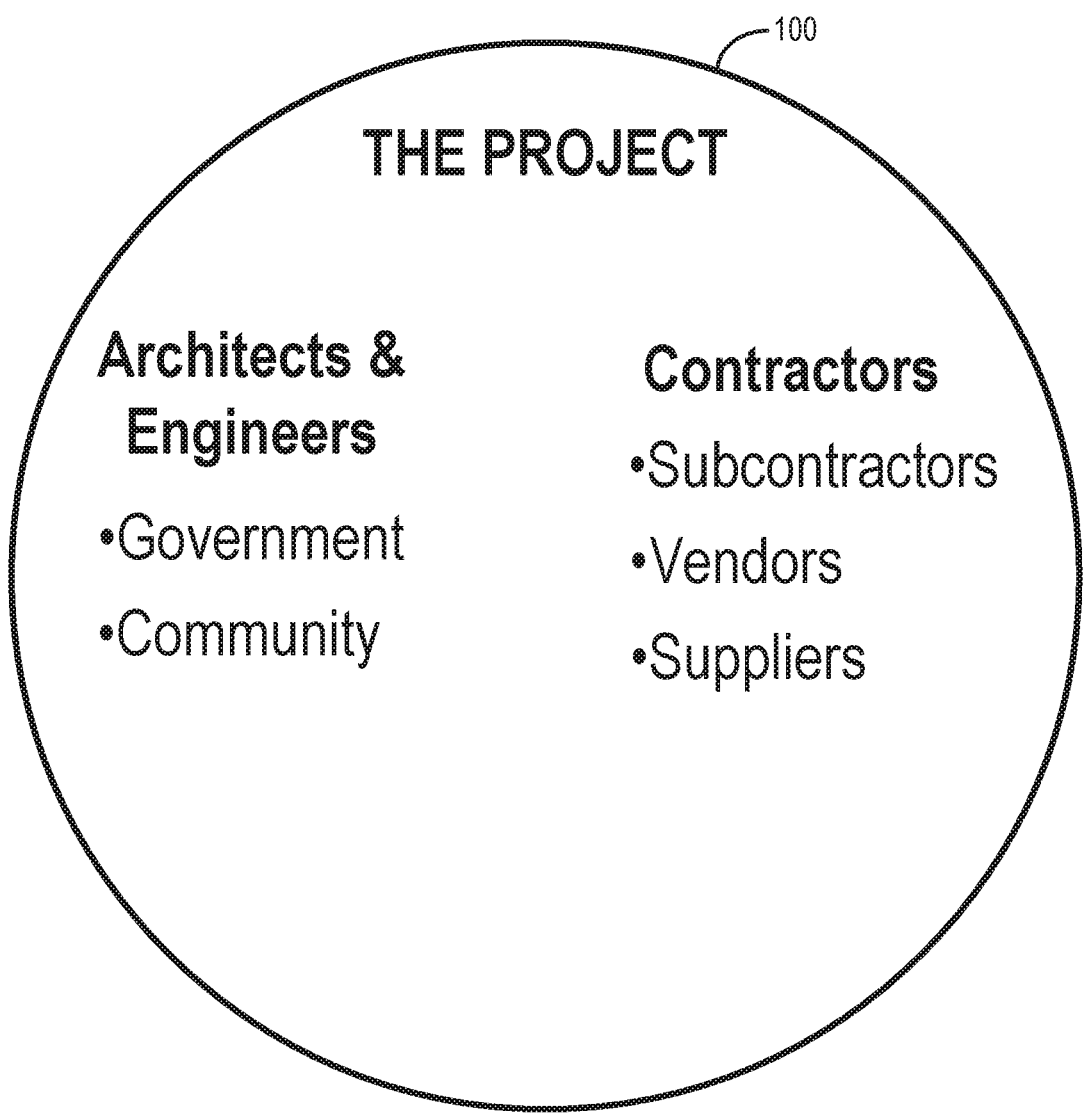
FIG. 1 schematically illustrates an example construction project.

Referring now to FIG. 1, an example project 100 may include various entities working together. Architects and engineers, as noted in the background, may create project models and building plans, and adjust those plans to comply with various codes and regulations. In various embodiments, architects and engineers may include civic personnel (e.g., from the government and/or community organizations).

Contractors may be engaged to execute the plans and models provided by the architects and engineers. As noted above, contractors may include subcontractors, vendors, suppliers and any other entities that are in contractual relationship with another contractor entity to execute a portion of a project or to supply a good or service related to the project.

Figure 2:
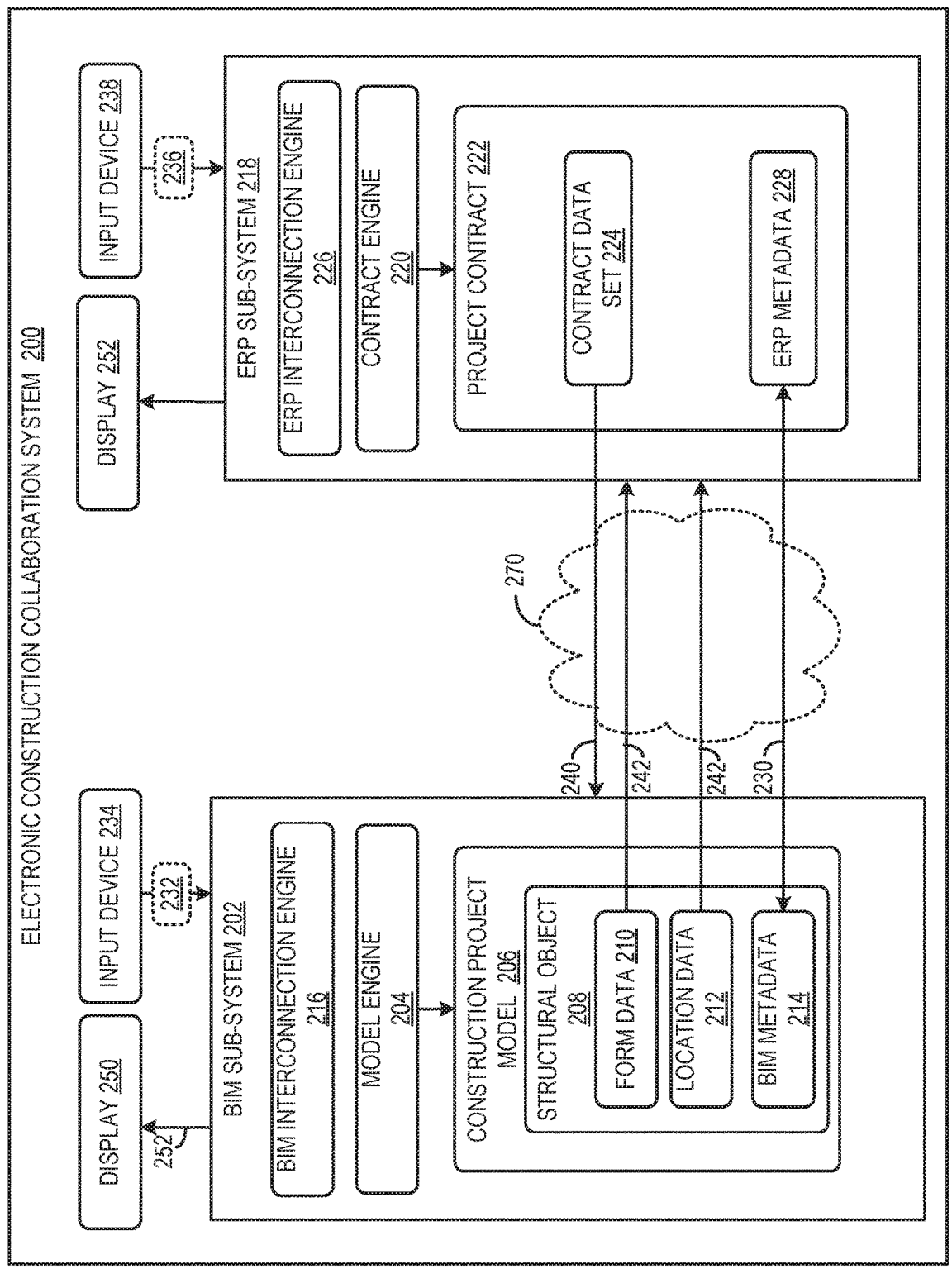
FIG. 2 shows a schematic depiction of an electronic construction collaboration system.

Referring to FIG. 2, an electronic construction collaboration system 200 is depicted. The electronic construction collaboration system 200 may be used by a variety of professionals such as architects, engineers, contractors, etc. The system may enable the aforementioned professionals to efficiently manage one or more constructions projects, such as projects for constructing buildings, roads, bridges, canals, dams, etc.

The electronic construction collaboration system 200 includes a BIM sub-system 202. The BIM sub-system 202 is configured to provide dimensional rendering (e.g., 2-D rendering, 3-D rendering) of a construction model for the professionals discussed above such as architects and engineers. Additionally, contractors may also utilize the BIM sub-system 202 due to the communications bridge established between the sub-systems in the electronic construction collaboration system 200, discussed in greater detail herein.

The BIM sub-system 202 may include a plurality of engines for implementing various functionalities. Additionally, the BIM sub-system 202 may include one or more computing devices having code stored in memory executable by a processor to implement the aforementioned functionality. Therefore, the BIM sub-system may include and execute one or more application programs via one or more hardware components.

The engines may include a model engine 204 configured to generate a construction project model 206. The model engine 204 may be executed by programs such as Autodesk, CypeCAD, Vico Office Suite, etc. The construction project model 206 may include at least one structural object 208. However, it will be appreciated that in some examples, the construction project model 206 may include a plurality of structural objects. In such an example, the structural objects may be parametrically defined with regard to other structural objects in the construction project model. That is to say that the structural objects may be defined as parameters and relations to other objects, so that if a related object is amended, dependent ones may also change. The construction project model 206 may be any suitable model such as a building, bridge, road, canal, dam, etc.

The structural object 208 may include form data 210 defining the contours, size, and other geometric features of the object. The structural object 208 may further include location data 212 defining the location of the object. The structural object 208 may also include BIM metadata 214. The BIM metadata 214 may include one or more of material data, vendor data, project number data, project phase data, a subcontract number, project schedule data, and cost data. The aforementioned types of data may each correspond to a different data field. Additionally, the model engine 204 may also be configured to enable the user to manipulate the structural objects, augment the structural objects, delete one or more of the structural objects, etc.

The BIM sub-system 202 further includes a BIM interconnection engine 216 configured communicatively link the BIM sub-system 202 to an ERP sub-system 218. Specifically, digital metadata independent of graphical rendering of the BIM sub-system may be linked with digital metadata in the ERP sub-system via the interconnection engine. In this way, electronic communication between the two sub-systems is established. The BIM interconnection engine 216 is depicted as a separate component from the model engine 204. However in some examples, the interconnection engine 216 may be integrated into the model engine 204.

The ERP sub-system 218 is included in the electronic construction collaboration system 200. The ERP sub-system 218 also includes a plurality of engines configured to implement various computing functionalities. The ERP sub-system 218 may include one or more computing devices having code stored in memory executable by a processor to implement the aforementioned functionality. Therefore, the ERP sub-system may include and execute one or more application programs via one or more hardware components. Specifically, the ERP sub-system 218 includes a contract engine 220 configured to generate and/or manage (e.g., augment, delete, and/or overwrite data in the contract) a project contract 222. It will be appreciated that the ERP sub-system 218 may include a plurality of project contracts related to different aspects of the construction project. Furthermore, the project contract 222 may be delineated into contract elements associated with different aspects of the construction project.

The project contract 222 further includes a contract data set 224. The contract data set 224 includes contract documents, cost data, labor hour data, and/or equipment hour data. The contract data set 224 therefore may include one or more files, data structures, etc. The project contract 222 further includes ERP metadata 228. The ERP metadata 228 may be associated with the contract data set 224. The ERP metadata 228 may include one or more of material data, vendor data, project number data, project phase data, a subcontract number, project schedule data, and cost data. The aforementioned types of data may each correspond to a different data field.

The ERP sub-system 218 further includes an ERP interconnection engine 226 configured to communicatively link the ERP sub-system 218 to the BIM sub-system 202. It will be appreciated that both the ERP interconnection engine 226 and the BIM interconnection engine 216 may work in combination to provide this functionality, in some examples.

The ERP interconnection engine 226 and the BIM interconnection engine 216 may both be configured to associatively link the BIM metadata 214 and the ERP metadata 228.

Specifically, corresponding metadata fields in the BIM metadata and the ERP metadata may be associatively linked (e.g., mapped) to one another indicated at arrow 230. The metadata may be mapped via a manual selection process, in one example. For instance, a user of the system may manually select linked metadata fields. Additionally or alternatively, the metadata in the BIM sub-system and the ERP sub-system may be configured to comply with a similar standard and a one to one correlation, a one to two correlation, etc., may be drawn between metadata fields in the sub-systems. Still further in one example, a parser or an arranging process may be used to automatically link metadata fields in the sub-systems. For instance, design software may be used to look up a project identification number in the BIM sub-system and map metadata associated with the project ID to metadata associated with an identical project ID in the ERP sub-system. Thus, in one example the ERP metadata 228 may include a first data field corresponding to a second data field in the BIM metadata 214. In such an example, the first data field in the ERP metadata is associatively linked with a plurality of data fields in the BIM metadata. Thus, the ERP metadata and the BIM metadata may not have a one to one correspondence. Further in one example, the interconnection engines (216 and 226) may be configured to establish a plurality of links between ERP metadata and BIM metadata, each of the links may be associated with a particular building structural object. The links may be established based on a corresponding field, and once established, the links may include non-corresponding fields.

It will be appreciated that the mapping may be automatically implemented by the electronic construction collaboration system 200, in one example. However, in other examples, certain actions in the system may trigger the associative linking. For instance, receiving a structural object selection input 232 from an input device 234 may trigger the associative linking. The input device 234 may be any suitable input device such as a trackpad, a mouse, a keyboard, a touch screen, etc. The input device 234 may be included in the BIM sub-system 202, in some examples. Additionally or alternatively, actions performed in the ERP sub-system 218 may also trigger the associative linking of the BIM metadata 214 and the ERP metadata 228. Specifically, receiving a project contract selection input 236 from an input device 238 may trigger the associative linking. The input device 238 may be any suitable input device such as a trackpad, a mouse, a keyboard, a touch screen, etc. The input device 238 may be included in the ERP sub-system 218, in some examples.

The associative linking of the BIM metadata 214 may trigger (e.g., automatically trigger) data transfer between the BIM sub-system 202 and the ERP sub-system 218 or vice-versa Specifically, in one example the BIM sub-system 202 may receive a duplicate of the contract data set 224 sent from the ERP sub-system 218 in response to the associative linking of the metadata indicated at arrow 240. In another example, the BIM sub-system 202 may receive a selected portion of the elements included in the contract data set 224 sent from the ERP sub-system 218. The portion of elements sent to the BIM sub-system 202 by the ERP sub-system 218 may be determined based on the type of metadata that is communicatively linked. In another example, the ERP sub-system 218 may receive a duplicate of the location data 212 and/or the form data 210 sent from the BIM sub-system 202 in response to associatively linking the metadata, indicated at arrows 242. In this way, metadata associatively linked by the two sub-systems may trigger the sharing of relevant data between the two sub-systems. As a result, a user's productivity may be increased via a decrease in wasted time spent searching for pertinent information stored within different sub-systems.

The BIM interconnection engine 216 and/or the ERP interconnection engine 226 may be configured to format the contract data into Construction Operations Building Information Exchange (COBie) format prior to sending the contract data. COBie is a data format which may be useful for operations and maintenance information. Therefore, the COBie format may help provide a continuity of information and provide more effective metadata mapping. In one example, the COBie format includes a type of extensible markup language (XML) format.

The BIM sub-system 202 may be in electronic communication with a display 250 enabling a user to view graphical data generated in the sub-system. Therefore, the structural object 208 as well as the contract data set 224 may be presented on a graphical user interface (GUI) in the display. Likewise, the BIM sub-system 202 may be in electronic communication with a display 250, indicated via arrow 252. It will be appreciated that in some examples, the display 250 may be integrated into the BIM sub-system 202. Likewise, the ERP sub-system 218 may be in electronic communication with a display 260 enabling a user to view graphical data generated in the sub-system. Therefore, the contract data set 224 as well as the structural object 208 may be presented on the display 260. Additionally, the display 260 may be integrated into the BIM sub-system 202, in some examples. Further, in some examples, the BIM sub-system 202 may be remotely located from the ERP sub-system 218. Furthermore, it will be appreciated that each separate sub-system may include one or more hardware components, devices, etc., which may be colocated or remotely located. Moreover, the ERP sub-system 218 and the BIM sub-system 202 may be in electronic communication via a network 270 (e.g., the Internet, a LAN network, etc.)

Figure 3:
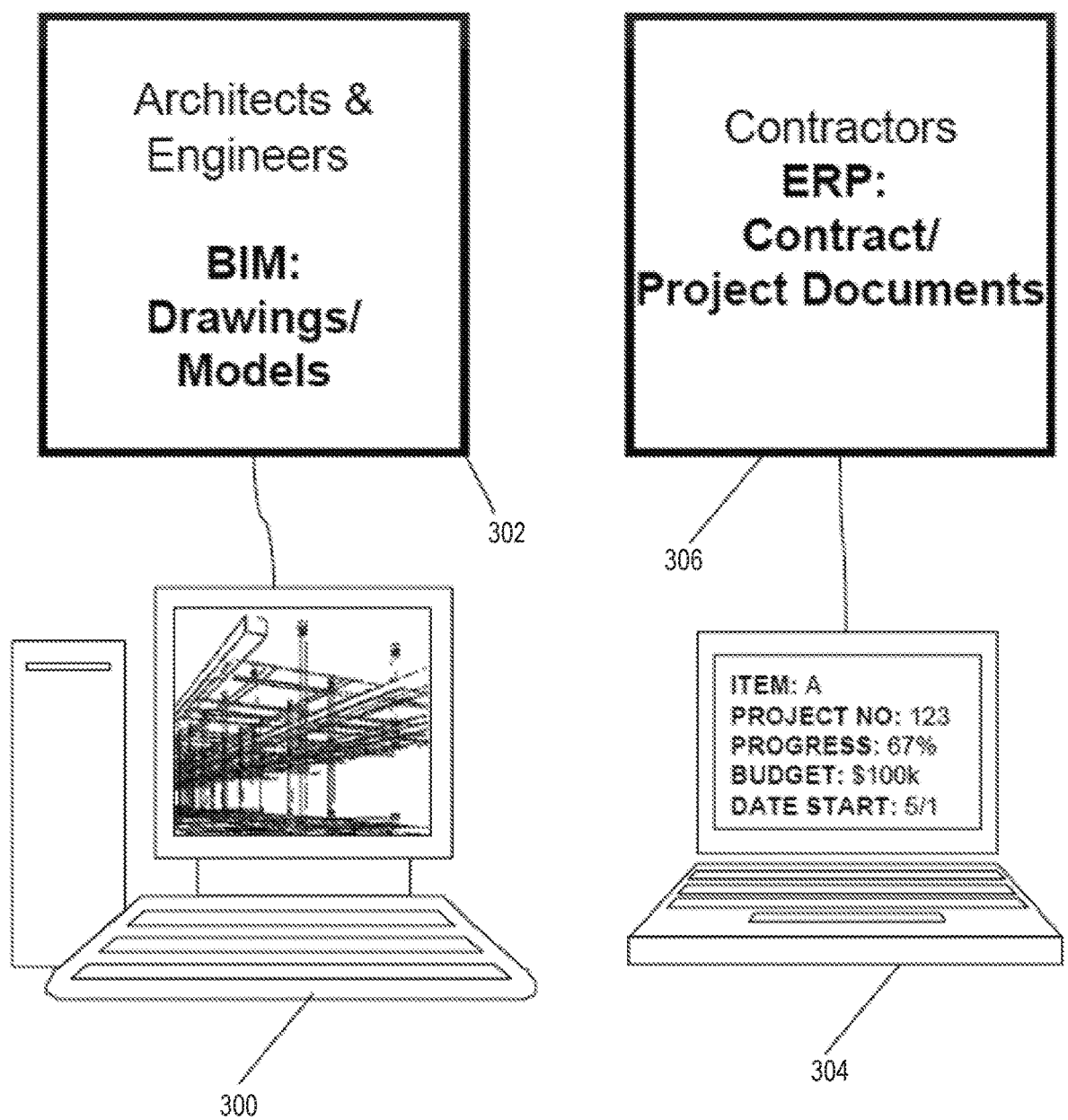
FIG. 3 schematically illustrates example computing devices that may be used as interfaces to Building Information Modeling ("BIM") and Enterprise Resource Planning ("ERP") sub-systems in the system shown in FIG. 2.

FIG. 3 shows an example use case scenario of the electronic construction collaboration system 200 shown in FIG. 2. Therefore, the devices, components, elements, etc., shown in FIG. 3 may be included in the system shown in FIG. 2. An architect or engineer may utilize a BIM computing device 300 configured with or having access to BIM sub-system 302 to create and/or modify project plans and models. As previously discussed the BIM sub-system may include software. In various embodiments, BIM sub-system 302 may be used to create a two-dimensional ("2D") or three-dimensional ("3D") drawing or model of a structure or building to be constructed as part of a project. 2D and 3D BIM drawings and/or models may include a plurality of objects. Each object may correspond to a particular structure within the overall model. BIM users may manipulate these objects in various ways. For instance, in some embodiments, a user may use a mouse, keyboard, light pin and/or other input devices to interact with a graphical user interface ("GUI") depicted on one or more displays of BIM computing device 300.

A contractor (e.g., general contractors, subcontractors, suppliers, vendors, etc.,) may use an ERP computing device 304 configured with or having access to ERP sub-system 306 to perform its role in a project. As previously discussed, the ERP sub-system may include software. For instance, a general contractor may utilize ERP computing device 304 to view and/or edit contract data and/or other more general project data, such as costs, completion status, safety incidences, change orders, and so forth.

While BIM computing device 300 is shown as a desktop computing device and ERP computing device 304 is shown as a laptop computing device, this is not meant to be limiting. Either of these computing devices, or any other computing device or system described herein, may be any type of computing device, including but not limited to a desktop computer, a laptop computer, a mobile phone, a tablet computing device, a personal digital assistance ("PDA"), a "dummy" terminal, a server, etc.

BIM sub-system 302 and ERP sub-system 306 are shown as blocks in FIG. 3 to indicate that they may be implemented in various forms. In some embodiments, local computing devices such as BIM computing device 300 and ERP computing device 304 may execute client programs that may be configured to connect to corresponding server programs executing on BIM/ERP server computers. In some such embodiments, BIM/ERP clients installed on computing devices such as BIM computing device 300 or ERP computing device 304 may store and retrieve data from a remote database (not shown), e.g., controlled by an BIM and/or ERP server.

Figure 4:
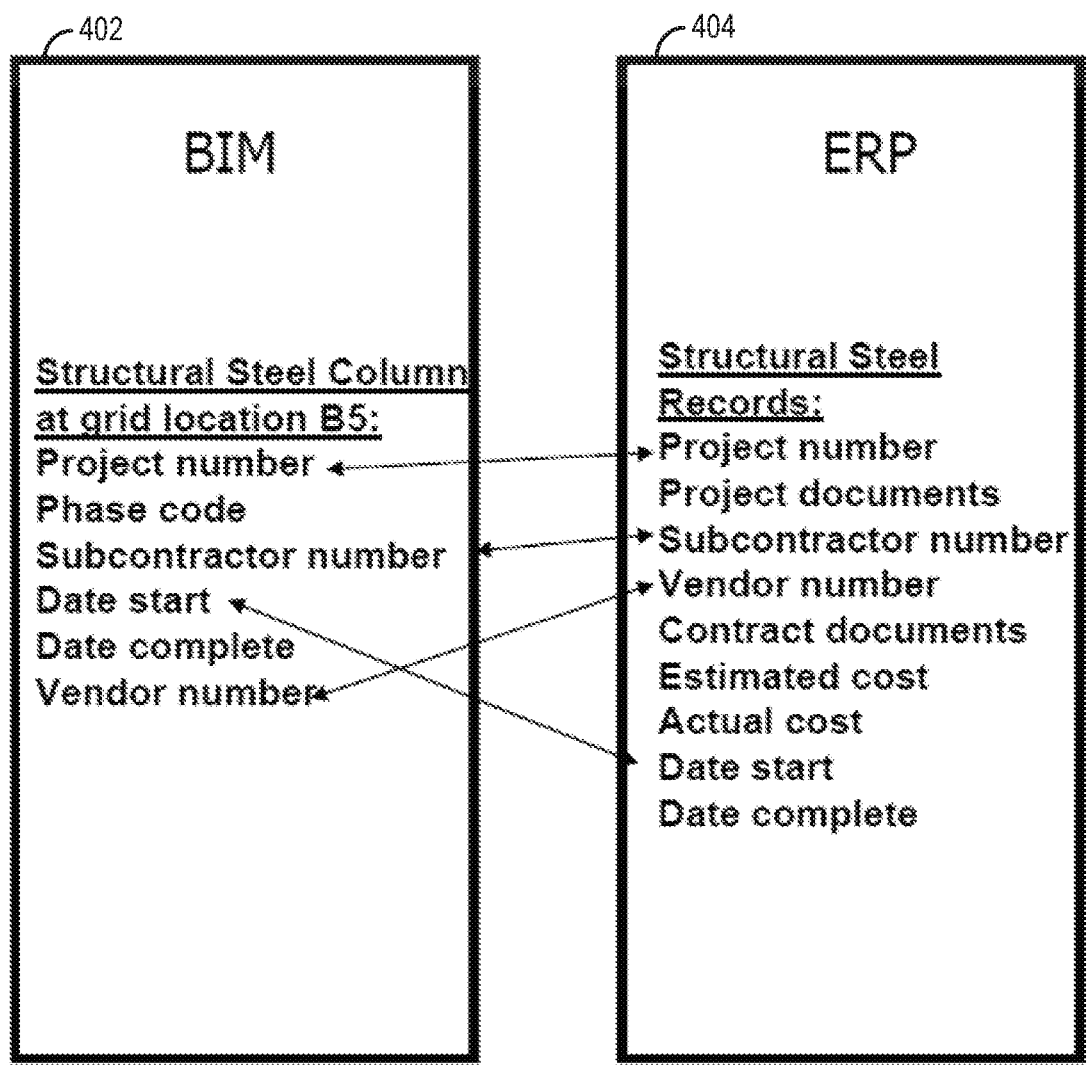
FIG. 4 schematically illustrates example BIM and ERP objects, metadata associated with those objects, and links between the metadata of objects across the BIM and ERP sub-systems.

BIM and ERP sub-systems may enable users to create, modify, and/or delete various objects. In various embodiments, these objects may be accompanied by metadata, which may describe various aspects of the objects. Examples of metadata are shown in FIG. 4. On the left, metadata for an example BIM sub-system 402 object, in this case a "structural steel column at grid location B5," may include but is not limited to: date start, date complete, project number, phase code, subcontract number, and vendor number. Similarly, on the right, metadata for an example ERP sub-system 404 record, in this case "structural steel records," may include but is not limited to: project number, project documents, vendor number, contract documents, estimated cost, actual cost, date start, and date complete. This metadata is provided as an example, and is not meant to be limiting in any way. Various other metadata (not shown) may additionally or alternatively be related to a component such as a structural steel column or structural steel records.

In various embodiments, objects that may correspond or relate to each other in real life may be classified and/or characterized differently in a BIM sub-system 402 versus an ERP sub-system 404, shown in FIG. 4. For instance, in FIG. 4, the arrows indicate that a number of metadata fields associated with each object may correspond or otherwise relate to each other. These relationships may be usable to link the BIM sub-system 402 and ERP sub-system 404, so that a user may interact with one sub-system to view data from both sub-systems. For example, a user of BIM sub-system 402 may be able to select the structural steel column at grid location B5 and request, from ERP sub-system 404, contractual documents or other data that is pertinent to the selected structural column or all structural columns in a project.

A number of metadata fields may be linked across BIM and ERP sub-systems. For example, both the "structural steel column at grid location B5" object of BIM sub-system 402 and the "structural steel records" of ERP sub-system 404 have "project number" fields. If the values of these objects' project number fields are the same, that may suggest that, at the very least, the BIM object and the ERP records relate to the same project. Additionally, both the BIM object and the ERP records in FIG. 3 have "vendor number" fields. If the vendor number for both objects and records is the same, that may further suggest that a single vendor was responsible for or at least involved with both the object and the associated records. In various embodiments, a user of BIM sub-system 402 could utilize a combination of the project number and vendor number fields to identify and view ERP records and data about pertinent BIM objects (e.g., contracts and other data related to the same project and vendor). Associated fields may further include a project identification number field, a vendor field, a construction phase/trade field, a project readiness field, a phase field, a delivery date field, a customer field, and/or an asset owner field. The project readiness field may include data that signifies if the project is complete or is pending. Furthermore, when a structural object is selected contract information as well as change order information may be displayed to a user of the BIM sub-system and/or the ERP sub-system. Change order data may be integrated into the system via the mapped metadata.

Additionally, time cards may be linked to a phase of construction in the ERP sub-system and therefore linked with associated metadata. In this way, time cards may be pulled (e.g., displayed to a user of the system) enabling payment and cost review by the user.

It should be understood that relationships between objects in BIM and records in ERP sub-systems, such as between the "structural steel column at grid location B5" of BIM sub-system 402 and the "structural steel records" of ERP sub-system 404, need not be one-to-one. A component in BIM sub-system 402 may correspond to more than one component in ERP sub-system 404, and vice versa. For example, an object in BIM sub-system 402 such as a structural steel column may correspond to multiple records (e.g., vendor, contract, etc.) in ERP sub-system 404 by virtue of shared metadata fields. As another example, a single contract in ERP sub-system 404 may relate to multiple individual objects in BIM sub-system 402, e.g., where a particular subcontractor is hired to build multiple structures.

Benefits of linking BIM sub-system 402 and ERP sub-system 404 via metadata may become clearer through an example. Assume a project manager is viewing an engineering drawing of a particular structural steel column in BIM sub-system 402, e.g., using BIM computing device 300 in FIG. 3. Assume also that the project manager wishes to view ongoing costs and contractual documents associated with the structural steel column. Rather than switching to ERP sub-system 404 (e.g., by moving to ERP computing device 304 in FIG. 3) and manually searching for contracts and other pertinent data related to the structural steel column, the project manager may simply direct BIM sub-system 402 to cross reference the metadata associated with the structural steel column in BIM sub-system 402 with corresponding metadata in the ERP sub-system 404. In this manner, the project manager may search for and retrieve project documents, contracts, and other data pertinent to the structural steel column from ERP sub-system 404, without transitioning between the two sub-systems.

Associations between metadata in BIM and ERP sub-systems are not limited to associations between objects in the architectural or engineering models like structural steel columns (BIM) and project documents or contracts (ERP). In various embodiments, associations may additionally or alternatively include an association between objects in a BIM sub-system and other data related and unrelated to an ERP sub-system, including but not limited to cost data, labor hours, equipment hours, change orders, and so forth.

In various embodiments, BIM sub-system 402, ERP sub-system 404, or both may be configured to cross reference with each other on user-selected metadata fields. For example, the project manager from the example above may refine the search results by specifying particular metadata to be linked from BIM sub-system 402 to ERP sub-system 404. For instance, the project manager could request only ERP components with the same project number and/or subcontractor number as the current BIM object, or even the same start and finish dates. In some cases, the more fields selected for cross reference, the narrower the results may be.

While the BIM and ERP sub-systems described herein remain separate (though linked via metadata), this is not meant to be limiting. In various embodiments, rather than separate BIM and ERP sub-systems simply being linked together using metadata, a single sub-system or application program may incorporate both BIM and ERP capabilities.

FIG. 5 depicts schematically one example of what a user of BIM computing device 300, shown in FIG. 3, might see on a display when the user selects a particular drawing or model feature (e.g., a bathroom fixture). In this example, a user may be viewing a building plan 502 and may have selected a particular feature, in this case, a dual sink 504. Selection of a feature in the drawing or model may cause another interface or window 506 to open. The other interface or window 506 may depict various BIM-related information about the selected feature, such as the entity installing it, materials involved, etc. Moreover, the other interface or window 506 may also display non-BIM related information (including but not limited to ERP-related information) about the selected feature, such as contracts related to the feature, amounts received and paid for the particular feature, cash flow relating to the feature, the entity (e.g., subcontractor) responsible for constructing the feature, information relating to that entity, any change order requests or approvals pertinent to that particular feature, information about materials used for the feature, and so forth.

Figure 6:
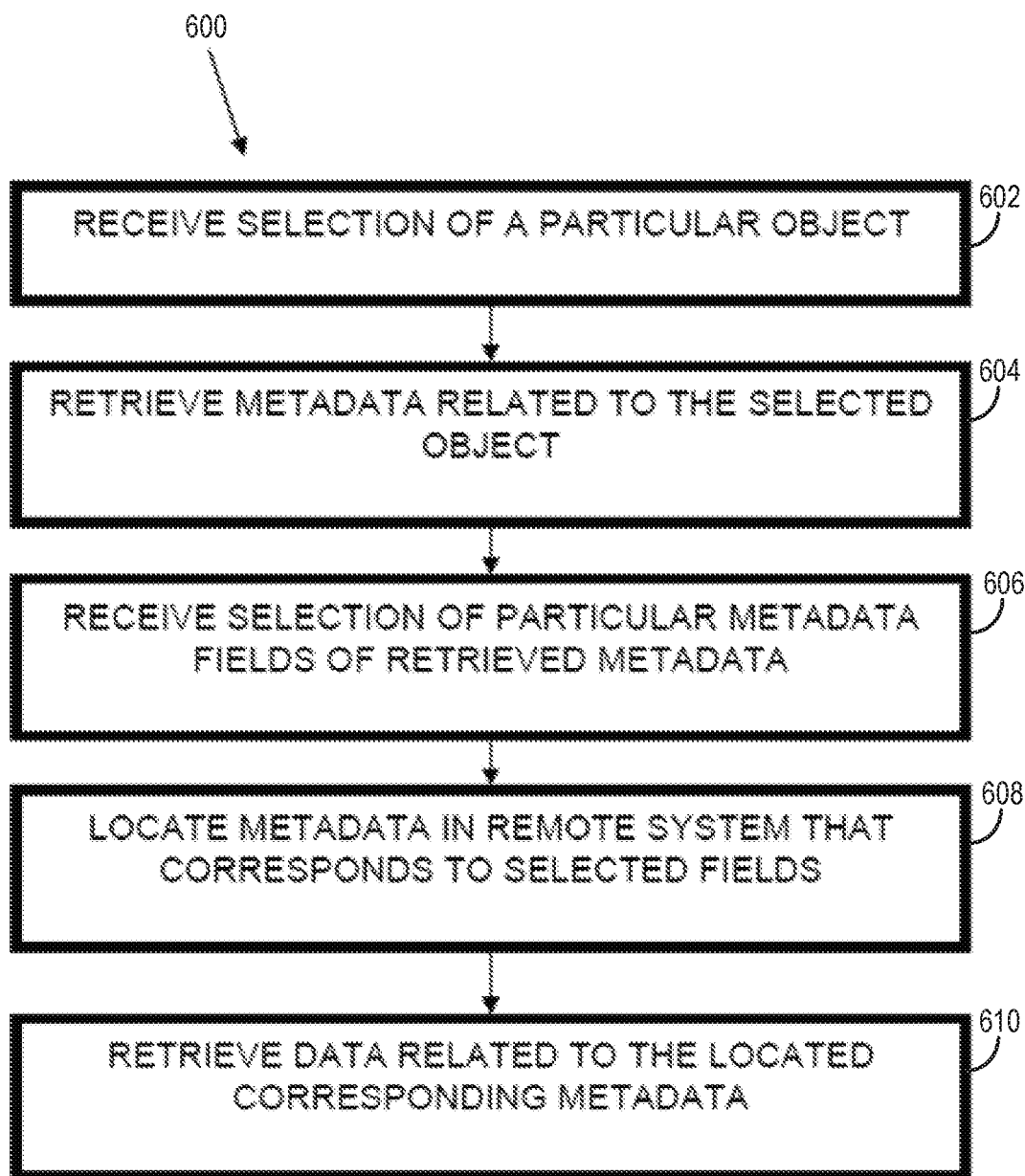
FIG. 6 schematically depicts an example method that may be implemented on a computing device associate with a BIM or ERP sub-system.

FIG. 6 depicts an example method 600 that may be implemented by a computing device such as BIM computing device 300 and/or ERP computing device 304 in FIG. 3. Although the operations are depicted in a particular order, this is not meant to be limiting. One or more operations may be reordered, added and/or omitted without departing from the present disclosure.

At 602, input may be received, e.g., by BIM computing device 300 and/or ERP computing device 304, that indicates that a user has selected (e.g., has interest in) a particular object. For example, if the user is using a BIM sub-system (e.g., via BIM computing device 300), the user may select (e.g., using a mouse, light pin, etc.) a graphical or textual object corresponding to a component of a building or other structure, such as the dual sink described above. Likewise, if the user is using the ERP sub-system (e.g., via ERP computing device 304), the user may select a contract or other piece of data, e.g., using a mouse, keyboard, light pin, etc. In various embodiments, once selected, that object may become "active," and the user may perform various actions on the object (e.g., depending on the user's access credentials), such as modification, deletion, and so forth.

At 604, either upon selection of the object at 602 or responsive to an additional command from the user, metadata related to the selected object may be retrieved. For instance, if a user selects a "structural column" at BIM computing device 300, metadata relating to that object (e.g., shown in FIG. 3) may be retrieved, e.g., from a database associated with a BIM sub-system. In various embodiments, the retrieved metadata may be displayed or made available for display to the user.

At 606, input may be received from the user indicating a selection of particular metadata fields, e.g., for cross reference into a remote system. (As used herein, a "remote system" may refer to the ERP sub-system from the perspective of the BIM sub-system, and to the BIM sub-system from the perspective of the ERP sub-system.) The user may select metadata fields for a variety of reasons. For example, the user may wish to know what other portions of a project are being handled by the same subcontractor as the currently-selected BIM object. Accordingly, the user may select the "subcontractor number" metadata field, for cross reference into the ERP sub-system.

At 608, metadata corresponding to the metadata retrieved at 604 and/or the metadata fields selected at 606 may be located in the remote system. If the user is using BIM computing device 300, the corresponding metadata may be retrieved from ERP computing device 304 and/or an ERP sub-system 306. If the user is using ERP computing device 304, the corresponding metadata may be retrieved from BIM computing device 300 and/or BIM sub-system 302.

At 610, data to which the metadata located at 608 is associated may be retrieved. For instance, BIM computing device 300 may retrieve contracts and other data associated with metadata received from ERP sub-system 306 and/or ERP computing device 304. Alternatively, ERP computing device 304 may retrieve BIM objects associated with metadata received from BIM sub-system 302 and/or BIM computing device 300. Continuing the example described above, BIM computing device 300 may receive, e.g., from ERP sub-system 306, contracts and other data with metadata that matches the metadata selected at 606 and/or that relates to metadata retrieved at 604. If at 606 the user of BIM computing device 300 selected particular metadata fields of interest, such as a subcontractor number, then the contracts or other data returned from (e.g., ERP sub-system 306), may include any contracts or other data having the same subcontractor number.

Figure 7:
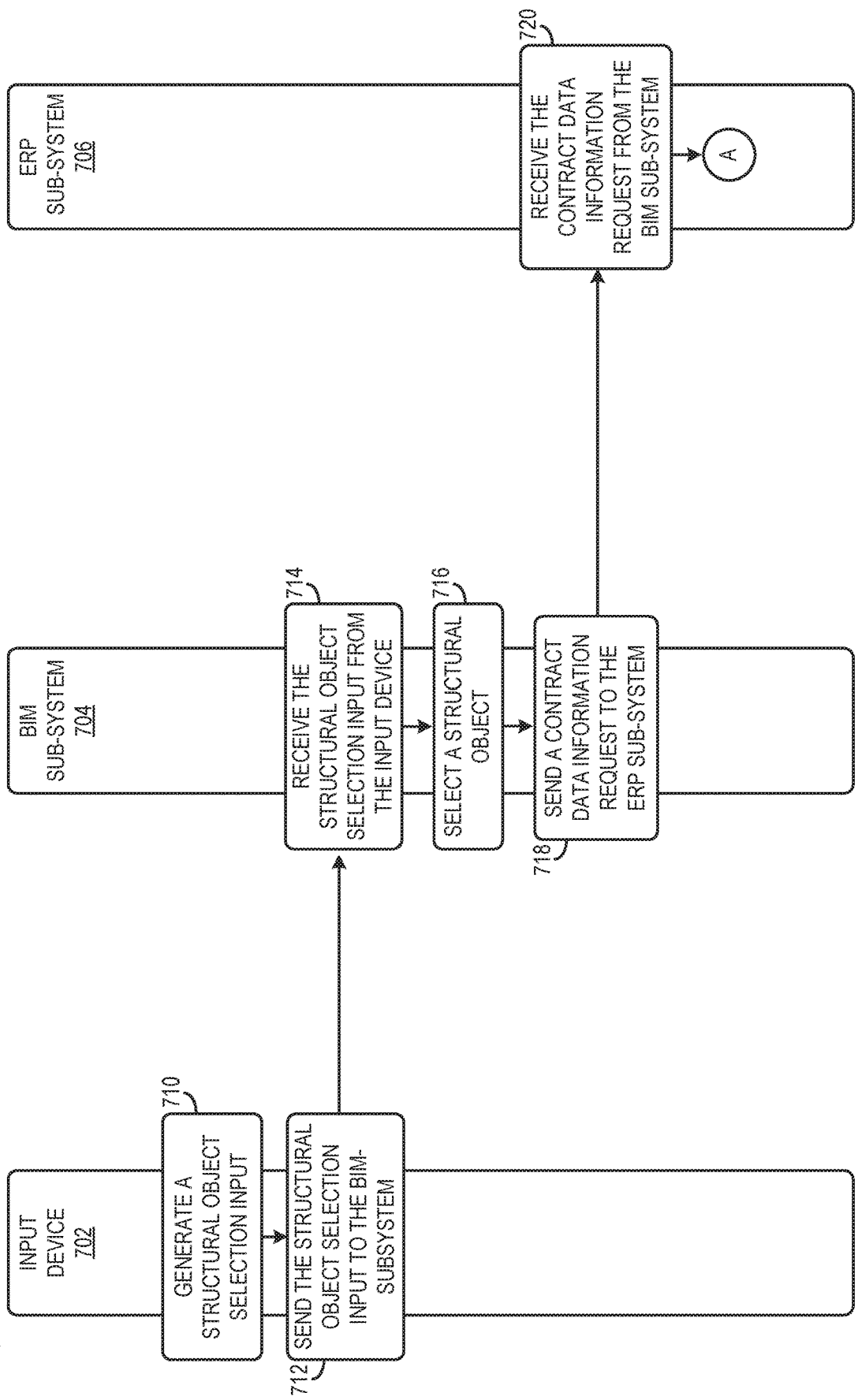
FIGS. 7 and 8 depict a method for managing a construction project.

FIG. 7 shows a method 700 for managing a construction project in an in an electronic construction collaboration system. The method shows an input device 702, BIM sub-system 704, and ERP sub-system 706 executing the method. It will be appreciated that the input device 702 may be similar to the input device 234 shown in FIG. 2. Likewise, the BIM sub-system 704 may be similar to the BIM sub-system 202 shown in FIG. 2 and the ERP sub-system 706 may be similar to the ERP sub-system 218 shown in FIG. 2. Thus, the method may be implemented via the electronic construction collaboration system, sub-systems, components, elements, etc., shown in FIG. 2 or may be implemented via another suitable electronic construction collaboration system.

At 710 the method includes, at the input device 702, generating a structural object selection input. For instance, an object may be selected via a mouse click over an object in a graphical user interface. Next at 712 the method includes sending the structural object selection input from the input device 702 to the BIM sub-system 704. At 714 the method includes receiving the structural object selection input at the BIM sub-system 704 sent from the input device 702.

Next at 716 the method includes selecting a structural object in response to receiving the structural object input, the structural object included in a construction project model in the BIM sub-system 704. BIM metadata included in the BIM sub-system included in the structural object. The BIM metadata may include material data, vendor data, project number data, project phase data, a subcontract number, project schedule data, and cost data. Additionally, the structural object may include form data and location data. As previously discussed, the metadata may be included in a metadata set having a plurality of data fields.

At 718 the method includes sending a contract data information request to the ERP sub-system from the BIM sub-system. The contract data information request may include BIM metadata. Next at 720 the method includes receiving the contract data information request from the BIM sub-system at the ERP sub-system. It will be appreciated that the contract data information request may be more generally referred to as an information request.

Figure 8:
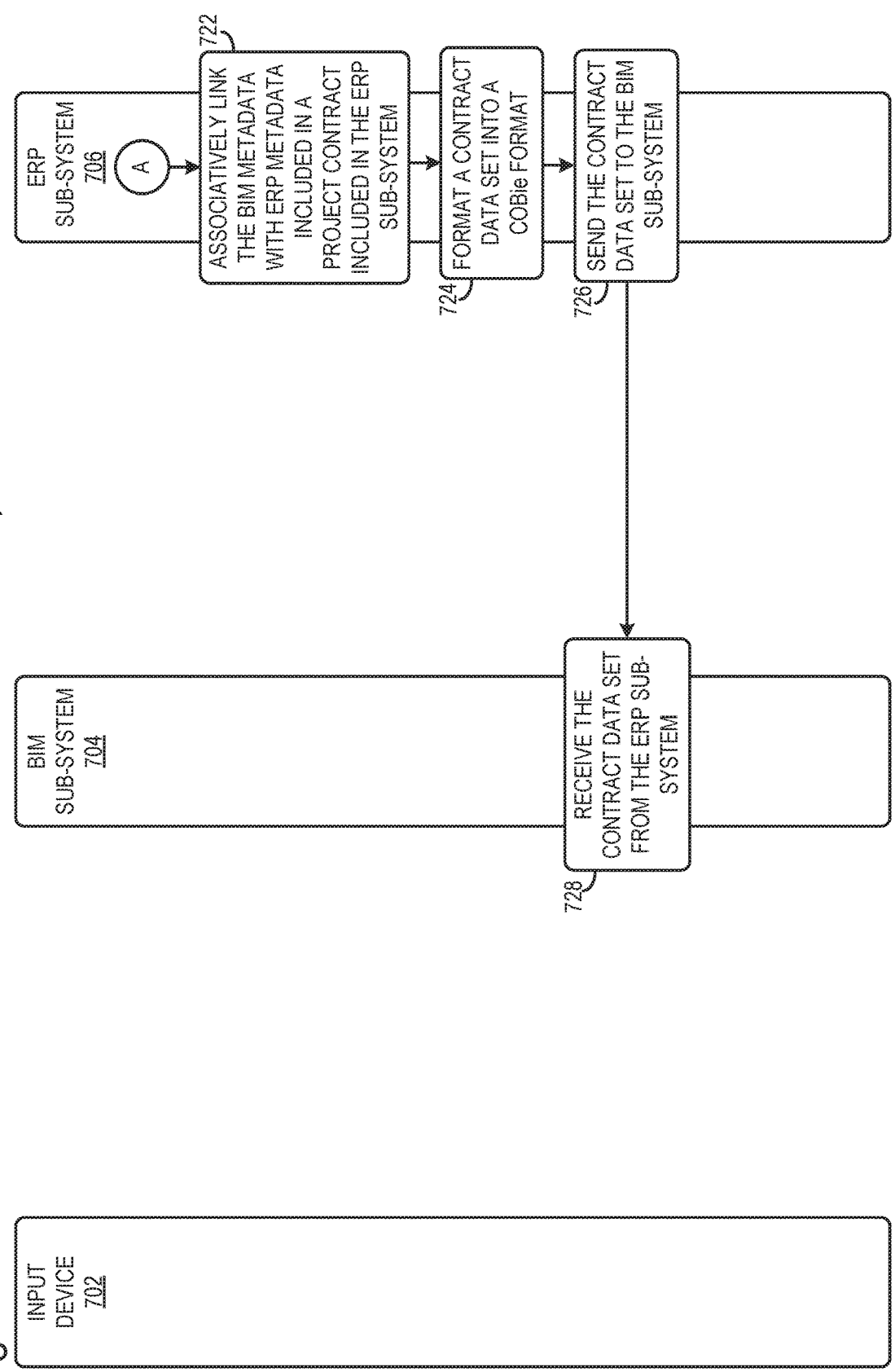

Referring to FIG. 8, at 722 the method includes associatively linking the BIM metadata with ERP metadata included in a project contract included in the ERP sub-system at the ERP sub-system. However, in other examples the associative linking may be implemented in the BIM sub-system. In this way, metadata in both the BIM and ERP sub-systems may be mapped to provide a communication bridge between the systems to increase the system's efficiency. It will be appreciated that associatively linking metadata in the two sub-systems may include selecting a set of ERP metadata from a plurality of sets of ERP metadata, the set of metadata including at least one metadata field included in the BIM metadata. Each set of ERP metadata may be associated with a different project contract. In this way, relevant project contracts may be identified for subsequent transfer to the BIM sub-system and display by the BIM sub-system. Thus, a contractor, architect, engineer, etc., may view contracts related to the structural object via the BIM sub-system without switching systems. As previously discussed, the ERP metadata and the BIM metdata may include one or more of material data, vendor data, project number data, project phase data, a subcontract number, project schedule data, and cost data. It will be appreciated that the metadata may be independent of the graphical data rendered via a rendering model in the BIM sub-system.

Next at 724 the method includes formatting a contract data set into a COBie format. The COBie format may include a type of XML format. At 726 the method includes sending the contract data set from the ERP sub-system to the BIM sub-system. In this way, contract data may be automatically sent to the BIM sub-system, enabling a user of the BIM sub-system to not only interact with a project model but also access pertinent contract information associated with the contract model stored in the ERP sub-system.

Figure 9:
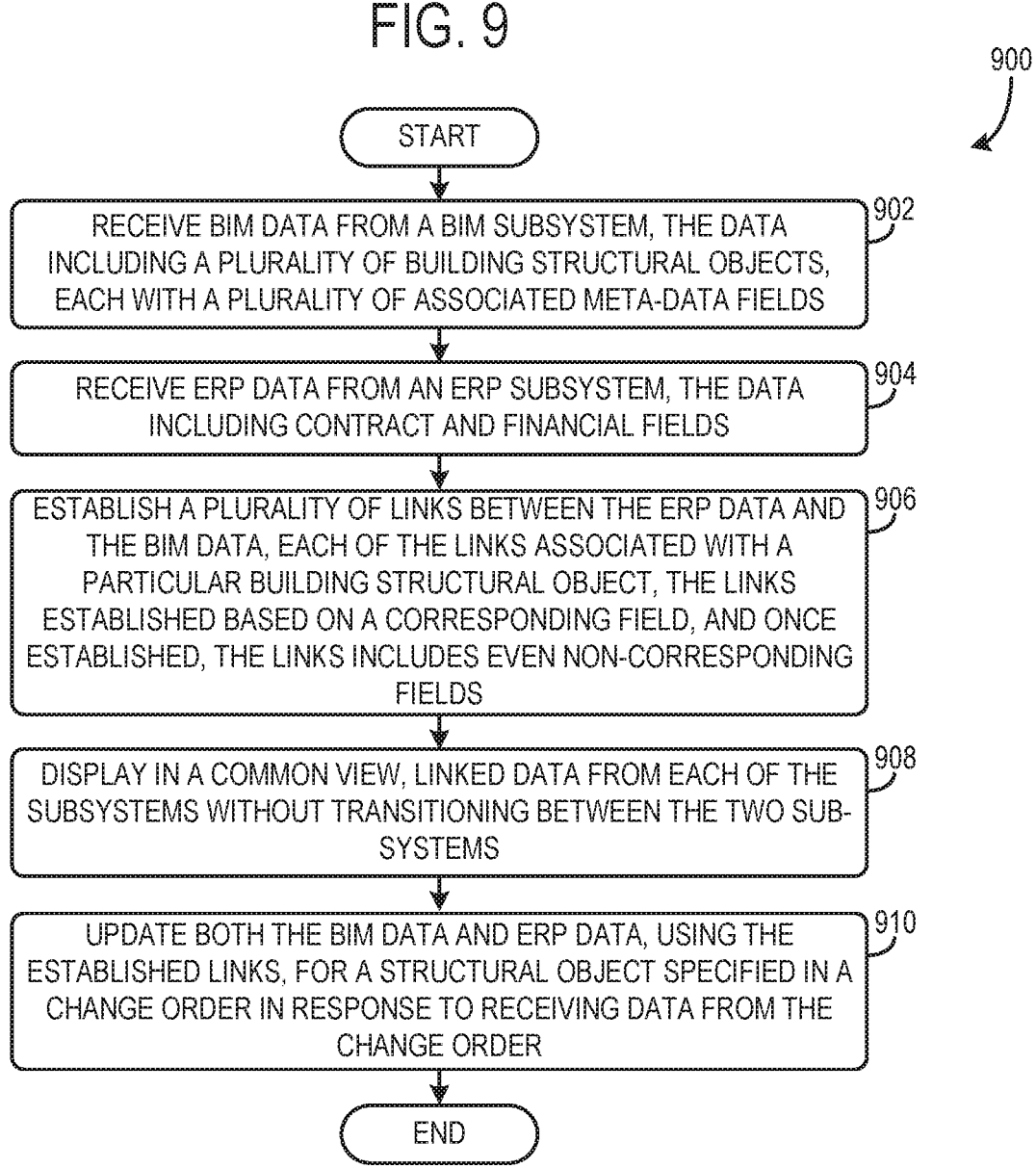
FIG. 9 depicts another method for managing a construction project.

FIG. 9 shows a method 900 for managing a construction project in an in an electronic construction collaboration system. The method 900 may be implemented via the electronic construction collaboration system, sub-systems, components, elements, etc., shown in FIG. 2 or may be implemented via another suitable electronic construction collaboration system.

At 902 the method includes receiving BIM data from a BIM subsystem, the data including a plurality of building structural objects, each with a plurality of associated metadata fields.

Next at 904 the method includes receiving ERP data from an ERP subsystem, the data including contract and financial fields. At 906 the method includes establishing a plurality of links between the ERP data and the BIM data, each of the links associated with a particular building structural object, the links established based on a corresponding field, and once established, the links includes even non-corresponding fields. In one example, the establishment of the links is prioritized based on a number of corresponding fields between the ERP data and the BIM data for the particular building structural object. In this way, pertinent data may be correspondingly linked. Further in one example, at least two corresponding fields are required to establish the links, the at least two fields including a project number and a vendor number. Therefore, it may be determined if a link is established based on the number of corresponding fields. Further in one example, the plurality of links are further established based on COBie-formatted data.

Next at 908 the method includes displaying in a common view, linked data from each of the subsystems without transitioning between the two sub-systems. In one example, the displaying includes, first displaying in the common view the linked data associated only with a selected structural object, and in response to an addition user selection from the common view, displaying, in the common view, data for a structural object other than the selected structural object, but with fields in common with the selected structural object. Further in such an example, the data for the structural object other than the selected structural object includes a common vendor or sub-contractor for the selected structural object and the structural object other than the selected structural object. Further in one example, the linked data displayed in the common view includes one or more of an entity installing a selected structural object, materials for the selected structural object, a shape of the selected structural object, dimensions of the selected structural object, a contract for construction of the selected structural object, cash flow related to the selected structural object, change orders for the selected structural object, labor hours for the selected structural object, equipment hours for the selected structural object, approvals for the selected structural object, or combinations thereof. In this way, users can easily view common data without undue searching and/or switching between sub-systems. Further in one example, the linked data displayed in the common view includes time cards for the selected structural object.

At 910 the method includes updating both the BIM data and ERP data, using the established links, for a structural object specified in a change order in response to receiving data from the change order.

Figure 10:
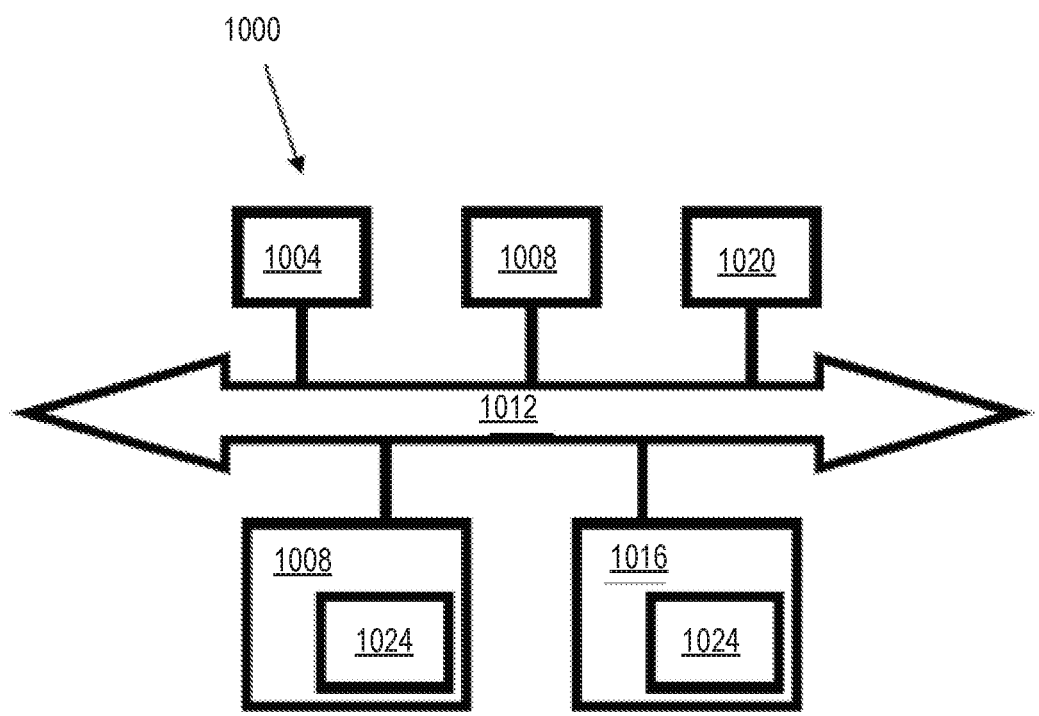
FIG. 10 schematically depicts an example computing device.

FIG. 10 illustrates a computing system 1000 configured to practice all or selected aspects of the operations described above and shown in FIG. 6. It will be appreciated that the BIM and/or ERP subsystems shown in FIG. 2 may include one or more of the components shown in the computing system 1000. As illustrated, computing system 1000 may include processor 1004, memory 1008, and bus 1012, coupled to each other as shown. Additionally, computing system 1000 may include storage 1016 and one or more communication interfaces 1020, e.g., a network interface card (NIC), or an antenna, coupled to each other, and the earlier described elements as shown.

Memory 1008 and storage 1016 may include, in particular, temporal and persistent copies of project logic 1024, respectively. The project logic 1024 may include instructions that when executed by the processor 1004 result in the various techniques described herein being performed.

In various embodiments, the memory 1008 may include random access memory (RAM), dynamic RAM ("DRAM"), static RAM ("SRAM"), synchronous DRAM ("SDRAM"), dual data rate RAM ("DDRRAM"), etc. In various embodiments, the processor 1004 may include one or more single-core processors, multiple-core processors, controllers, application-specific integrated circuits ("ASICs"), etc.

In various embodiments, storage 1016 may be a machine-accessible medium that includes integrated and/or peripheral storage devices, such as, but not limited to, disks and associated drives (e.g., magnetic, optical), universal serial bus ("USB") storage devices and associated ports, a solid state drive ("SSD"), flash memory, read-only memory ("ROM'), nonvolatile semiconductor devices, etc.

In various embodiments, storage 1016 may be a storage resource physically part of the computing system 1000 or it may be accessible by, but not necessarily a part of, the computing system 1000. For example, the storage 1016 may be accessed by the computing system 1000 over a network via the communication interface 1020. In various embodiments, computing system 1000 may have more or less components, and/or different architectures.

Although certain embodiments have been illustrated and described herein for purposes of description, the application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

In the preceding detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

In the description above various operations are described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The invention claimed is:

1. A method implemented by code stored in memory executable by at least one processor in a computing system, comprising:
receiving building information modeling (BIM) data from a BIM sub-system, the BIM data representing a construction project model including a plurality of structural objects with BIM data structures, the BIM data including BIM metadata associated with the BIM data structures;
receiving enterprise resource planning (ERP) data from an ERP sub-system, the ERP data including a contract and financial data set having ERP data structures and ERP metadata associated with the ERP data structures;
generating a plurality of links between the ERP data and the BIM data, each of the plurality of links associated with one of the plurality of structural objects and generated by:

determining values for a plurality of identified data field in the BIM metadata; and mapping the BIM metadata associated with the determined values of the plurality of identified data fields in the BIM metadata to ERP metadata associated with matching identified data field values in the ERP metadata, wherein the generation of each of the plurality of links is prioritized based on a number of data fields in the ERP metadata with values matching the determined values in the BIM metadata for a particular structural object included in the plurality of structural objects, and wherein, once generated, the plurality of links map an association between non-corresponding data fields in the BIM metadata and ERP metadata;

receiving, from a user of the BIM sub-system, a structural object selection, the structural object including the BIM data and the BIM metadata;

displaying to the user of the BIM sub-system, in a common view, the linked ERP data and BIM data including BIM and ERP data related to the non-corresponding BIM and ERP metadata without requiring the user to navigate between the BIM sub-system and the ERP sub-system;

receiving, from the user of the BIM subsystem, an indication of an update, the indication of the update comprising a change order having updates to at least a portion of the BIM data and the ERP data; and automatically updating the data stored in the BIM sub-system and ERP sub-system based on the received indication of the update.

2. The method of claim 1, where generating the plurality of links between the ERP data and the BIM data includes executing a parser to generate linked ERP and BIM data structures.

3. The method of claim 1, further comprising, responsive to generating the plurality of links between the ERP data and the BIM data, automatically triggering data transfer from the BIM sub-system to the ERP sub-system, the data transfer including location data and form data, the location data defining one more of a contour and size of one or more of the plurality of structural objects, and the location data defining a location of one or more of the plurality of structural objects.

4. The method of claim 1, where the non-corresponding BIM metadata and ERP metadata include one or more of material data, vendor data, project number data, project phase data, a subcontract number, project schedule data, and cost data.

5. The method of claim 1, wherein the displaying is triggered in response to user selection of one of the plurality of structural objects.

6. The method of claim 1, wherein the identified data field in the BIM metadata includes a vendor or sub-contractor.

7. The method of claim 1, wherein the plurality of links are further generated based on Construction Operations Building Information Exchange (COBie) formatted data.

8. An electronic construction collaboration system for managing a construction project comprising:

an enterprise resource planning (ERP) sub-system including code stored in memory executable by a processor to implement;

a contract engine configured to generate at least one project contract including a contract data set with ERP metadata; and an interconnection engine configured to:

generate a link between the ERP metadata and building information modeling (BIM) metadata corresponding to a structural object of a construction project model stored in a BIM sub-system based on a correspondence between one or more first data fields in the ERP metadata and one or more second data fields in the BIM metadata, wherein the generation of the link includes determining a match between a determined value for the one or more first data fields in the ERP metadata and a determined value the corresponding one or more second data fields in the BIM metadata, the generation of the link is prioritized based on a number of first data fields in the ERP metadata with values corresponding to second data fields in the BIM metadata for the structural object, and once generated, the generated link maps an association between non-corresponding data fields in the ERP metadata and the BIM metadata;

send the contract data set to the BIM sub-system in response to receiving a user's selection in the BIM sub-system using the link between the ERP metadata and the BIM metadata, the generated link mapping an association between corresponding and non-corresponding BIM metadata in the BIM sub-system and ERP metadata in the ERP sub-system;

automatically receive and update the contract data based on a change order received in the BIM sub-system, the change order having indications of updates to the contract data including updates to the ERP data in the non-corresponding data fields; and send the updated contract data to the ERP sub-system using the generated map between the non-corresponding data fields in the ERP metadata and the BIM metadata.

9. The electronic construction collaboration system of claim 8, where the interconnection engine is further configured to format the contract data set into a Construction Operations Building Information Exchange (COBie) format prior to sending the contract data set to the BIM sub-system.

10. The electronic construction collaboration system of claim 8, where the non-corresponding BIM metadata and ERP metadata include one or more of material data, vendor data, project number data, project phase data, a subcontract number, project schedule data, and cost data.

11. The electronic construction collaboration system of claim 8, where generating the link between the ERP metadata and the BIM metadata includes executing a parser to generate linked ERP and BIM data structures.

12. The electronic construction collaboration system of claim 8, where the ERP metadata includes a first data field corresponding to a second data field in the BIM metadata.

13. The electronic construction collaboration system of claim 12, where the first data field in the ERP metadata is mapped to a plurality of data fields in the BIM metadata.

14. The electronic construction collaboration system of claim 12, where the first data field and the second data field are each included in separate data sets.

15. The electronic construction collaboration system of claim 8, where the contract data set includes contract documents, cost data, labor hour data, and equipment hour data.

16. A method for managing a construction project, the method implemented by code stored in memory executable by a processor in an electronic construction collaboration system, the method comprising:

generating a link between building information modeling (BIM) data and enterprise resource planning (ERP)

data based on a correspondence between one or more data fields in the BIM metadata and ERP metadata, the link mapping an association between data in a BIM sub-system and an ERP sub-system including a map between non-corresponding fields in the BIM metadata and ERP metadata, wherein the structure and organization of the BIM sub-system is different from the structure and organization of the ERP sub-system, and wherein generating the link includes:
  determining a value for the one or more data fields in the BIM metadata and the corresponding one or more data fields in the ERP metadata; and
  mapping the BIM metadata associated with the determined value of the one or more data fields in the BIM metadata to ERP metadata associated with a matching value in the one or more data fields in the ERP metadata,
  wherein the generation of the link is prioritized based on a number of data fields in the ERP metadata with values matching the determined values in the BIM metadata for a particular structural object;
receiving a structural object selection input from a BIM sub-system user;
selecting a structural object in a construction project model executed by the BIM sub-system in response to receiving the structural object selection input, the structural object including BIM data and BIM metadata;
retrieving ERP data from the ERP sub-system in the electronic construction collaboration system in response to selecting the structural object using the link between the BIM data and the ERP data, the retrieved ERP data including data associated with the non-corresponding fields;
displaying the BIM data and ERP data to the BIM sub-system user without requiring the user to navigate in the ERP sub-system;
receiving an input associated with the structural object from the BIM sub-system user, the input comprising a change order having updates to the BIM data and the ERP data;
automatically updating both the BIM data in in the BIM sub-system and the ERP data in the ERP sub-system, using the link, based on and in response to receiving the input associated with the structural object, wherein the automatically updating includes using the map between non-corresponding fields in the BIM metadata and ERP metadata to update non-corresponding fields in the ERP sub-system; and
storing the updated BIM data in the BIM sub-system and the updated ERP data in the ERP sub-system.

17. The method of claim 16, where generating the link between the BIM data and the ERP data includes executing a parser to generate linked BIM and ERP data structures.

18. The method of claim 17, where the structural object is defined parametrically with regard to other structural objects in the construction project model.

* * * * *

UNITED STATES PATENT AND TRADEMARK OFFICE
CERTIFICATE OF CORRECTION

| | |
|---|---|
| PATENT NO. | : 11,200,522 B2 |
| APPLICATION NO. | : 15/443844 |
| DATED | : December 14, 2021 |
| INVENTOR(S) | : Harris et al. |

It is certified that error appears in the above-identified patent and that said Letters Patent is hereby corrected as shown below:

In the Specification

In Column 6, Line 45, delete "versa" and insert -- versa. --.

In Column 12, Line 20, delete "metdata" and insert -- metadata --.

In the Claims

In Column 18, Line 12, in Claim 16, delete "in in" and insert -- in --.

Signed and Sealed this
Eleventh Day of October, 2022

Katherine Kelly Vidal
*Director of the United States Patent and Trademark Office*